US010070073B2

United States Patent
Kasai et al.

(10) Patent No.: US 10,070,073 B2
(45) Date of Patent: Sep. 4, 2018

(54) CAMERA FOR VISUALIZING STATES OF DISTRIBUTION OF RADIOACTIVE SUBSTANCES

(71) Applicant: MITSUBISHI HEAVY INDUSTRIES, LTD., Tokyo (JP)

(72) Inventors: Shigeo Kasai, Tokyo (JP); Katsuhiro Saito, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 367 days.

(21) Appl. No.: 14/771,072

(22) PCT Filed: Feb. 27, 2014

(86) PCT No.: PCT/JP2014/054934
§ 371 (c)(1),
(2) Date: Aug. 27, 2015

(87) PCT Pub. No.: WO2014/148224
PCT Pub. Date: Sep. 25, 2014

(65) Prior Publication Data
US 2016/0006952 A1    Jan. 7, 2016

(30) Foreign Application Priority Data

Mar. 22, 2013   (JP) .................................. 2013-060229

(51) Int. Cl.
*H04N 5/33*       (2006.01)
*G01T 7/00*       (2006.01)

(52) U.S. Cl.
CPC    *H04N 5/33* (2013.01); *G01T 7/00* (2013.01)

(58) Field of Classification Search
CPC .................................. H04N 5/33; G01T 7/00
(Continued)

(56) References Cited

U.S. PATENT DOCUMENTS

2005/0117698 A1   6/2005 Lacey et al.
2007/0080296 A1   4/2007 Ueno et al.
(Continued)

FOREIGN PATENT DOCUMENTS

EP    1 780 557        5/2007
EP    1780557 A2 *     5/2007    ........... G01T 1/2985
(Continued)

OTHER PUBLICATIONS

International Search Report dated May 27, 2014 in International Application No. PCT/JP2014/054934.
(Continued)

*Primary Examiner* — Mehrdad Dastouri
*Assistant Examiner* — Kristin Dobbs
(74) *Attorney, Agent, or Firm* — Wenderoth, Lind & Ponack, L.L.P.

(57) ABSTRACT

A camera (10) that includes: a sensor module (1) which measures radiation data; heat radiation parts (14-1, 14-2) which radiate heat generated as the sensor module (1) is cooled; an electrical apparatus (20); and fans (15-1, 15-2) which generate a flow of a first fluid for cooling the heat radiation parts (14-1, 14-2). The camera further has a first passage (41) through which the first fluid flows, a second passage (43) through which a second fluid for cooling the electrical apparatus (20) flows, and a merging part (44) which suctions the second fluid from the second passage (43) into the first passage (41) by means of the flow of the first fluid. Such a camera (10) can be made more compact than other cameras which further include a fan for circulating the second fluid through the second passage (43).

9 Claims, 6 Drawing Sheets (58) Field of Classification Search
USPC .......................................................... 348/164
See application file for complete search history.

(56) References Cited

U.S. PATENT DOCUMENTS

2009/0080620 A1   3/2009   Miyako et al.
2012/0138798 A1   6/2012   Kato et al.

FOREIGN PATENT DOCUMENTS

| JP | 57-173077   | 10/1982 |
| JP | 2000-111083 | 4/2000  |
| JP | 2002-71811  | 3/2002  |
| JP | 2006-128749 | 5/2006  |
| JP | 4138107     | 8/2008  |
| JP | 2011-53010  | 3/2011  |

OTHER PUBLICATIONS

Written Opinion of the International Searching Authority dated May 25, 2014 in International Application No. PCT/JP2014/054934 (with partial translation).
Extended European Search Report dated Feb. 17, 2016 in European patent application No. 14 76 7348.

* cited by examiner

CAMERA FOR VISUALIZING STATES OF DISTRIBUTION OF RADIOACTIVE SUBSTANCES

TECHNICAL FIELD

The present invention relates to a camera, and more particularly to a camera which is used for visualizing states of distribution of radioactive substances.

BACKGROUND ART

"Radioactive substance visualization cameras" are known which visualize states of distribution of radioactive substances. The radioactive substance visualization camera is equipped with a cooling device and a sensor module. The cooling device cools the sensor module. While being cooled at a predetermined temperature or lower, the sensor module measures radiation data which shows a state of distribution of radioactive substances.

PTL 1 discloses a radiation detector which measures radiation including X-rays and gamma rays. This radiation detector achieves an improved signal-noise ratio by cooling a semiconductor radiation detecting element by means of an electronic cooling element.

CITATION LIST

Patent literature

{PTL 1}
The Publication of Japanese Patent No. 4138107

SUMMARY OF INVENTION

Technical Problem

Some radioactive substance visualization cameras include a heat generation part, which generates heat, separately from the sensor module. It is desired that the heat generation part of such a radioactive substance visualization camera be cooled and at the same time as the camera is made compact.

An object of the present invention is to provide a compact camera.

Solution to Problem

A camera according to the present invention includes: a sensor module which, on exposure to radiation, measures radiation data for visualizing a state of distribution of radioactive substances; a heat radiation part which radiates heat generated as the sensor module is cooled; a heat generation part which is different from the sensor module; a fan which generates a flow of a first fluid for cooling the heat radiation part; and a case. In this camera, the case forms a first passage through which the first fluid flows, a second passage through which a second fluid for cooling the heat generation part flows, and a merging part which sucks the second fluid from the second passage into the first passage by means of the flow of the first fluid.

Such a camera can adequately cool both of the sensor module and the heat generation part by means of the first fluid and the second fluid, and can adequately measure the radiation data. Moreover, such a camera can be made more lightweight than other cameras which further include a fan for circulating the second fluid through the second passage.

The heat generation part may be an electrical apparatus which controls the sensor module. Such a camera can make the sensor module work more properly by adequately cooling the electronic apparatus.

The camera according to the present invention may further include a heat conducting member which comes into thermal contact with the sensor module. In this camera, the electrical apparatus is disposed further on a vertically upper side than the heat conducting member. In such a camera, water droplets formed by condensation on the heat conducting member are unlikely to come into contact with the electrical apparatus, and negative effects of the water droplets on the electrical apparatus can be reduced.

The case may further have an air intake opening for supplying the first fluid to the second fluid. The air intake opening is disposed further on a vertically lower side than the electrical apparatus. In such a camera, water droplets entering through the air intake opening are unlikely to come into contact with the electrical apparatus, and negative effects of the water droplets on the electrical apparatus can be reduced.

The second passage may be formed such that the second fluid flows through a periphery of the sensor module. In such a camera, conduction of heat from outside to the sensor module is reduced, so that the sensor module can be cooled adequately.

Advantageous Effects of Invention

The camera according to the present invention can adequately cool both of the sensor module and the heat generation part, and at the same time can be made more lightweight than other cameras which further include a fan for cooling the heat generation part.

DESCRIPTION OF EMBODIMENTS

Figure 1:
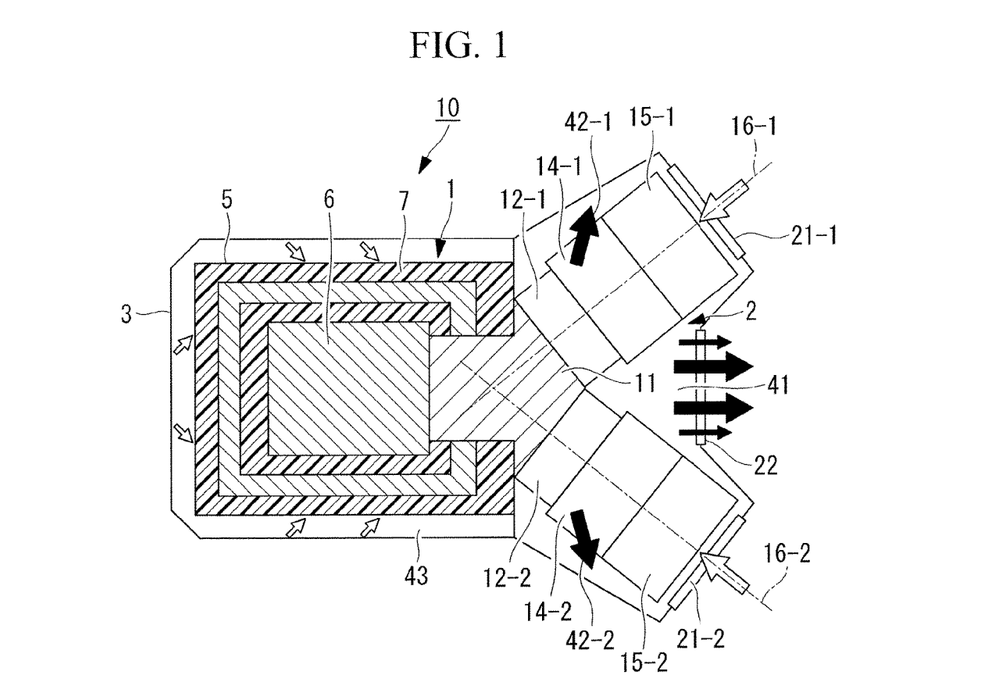
FIG. 1 is a sectional view showing an embodiment of a radioactive substance visualization camera.

Embodiments of a camera will be described below with reference to the drawings. As shown in FIG. 1, a radioactive substance visualization camera 10 includes a sensor module 1, a cooling device 2, and a case 3. The sensor module 1 includes a sensor case 5, an imaging sensor 6, and a heat insulation material 7.

The sensor case 5 is formed as a case which seals the inside. The imaging sensor 6 is disposed inside the sensor case 5. While being exposed to radiation emitted from radioactive substances, the imaging sensor 6 is controlled by an electrical apparatus, to be described later, so as to measure radiation data for visualizing the state of distribution of the radioactive substances. The radiation data shows a plurality of directions and a plurality of pieces of radioactivity data corresponding to the plurality of directions. Of the plurality of pieces of radioactivity data, a piece of radioactivity data corresponding to a certain direction shows the nuclide of the radioactive substance disposed in that direction from the radioactive substance visualization camera 10, and shows the amount of substance of the nuclide.

The heat insulation material 7 is formed of a material having a heat conductivity lower than the heat conductivity of a material forming the sensor case 5. The heat insulation material 7 covers the sensor case 5.

The sensor module 1 has the imaging sensor 6 disposed in a closed space sealed by the sensor case 5 and thereby prevents dew condensation on the imaging sensor 6. The sensor module 1 has the sensor case 5 covered with the heat insulation material 7 and thereby prevents heat from the outside of the radioactive substance visualization camera 10 from being conducted to the imaging sensor 6.

The cooling device 2 includes an aluminum plug 11, first Peltier cooler 12-1, a first radiator 14-1, and a first fan 15-1. The aluminum plug 11 is formed of metal aluminum. The aluminum plug 11 is formed of an inner portion and an outer portion, and the inner portion and the outer portion are in thermal contact with each other. The inner portion is disposed inside the sensor case 5, and is in thermal contact with the sensor module 1. The outer portion is disposed outside the sensor case 5.

The first Peltier cooler 12-1 includes a Peltier element. The first Peltier cooler 12-1 is disposed between the aluminum plug 11 and the first radiator 14-1, and is disposed so as to intersect a first straight line 16-1 connecting the aluminum plug 11 and the first radiator 14-1. The first Peltier cooler 12-1 is in thermal contact with the aluminum plug 11. The first Peltier cooler 12-1 is controlled by the electrical apparatus, to be described later, so as to transfer heat from the first aluminum plug 11 to the first radiator 14-1 by means of the Peltier element. That is, the first Peltier cooler 12-1 heats the first radiator 14-1 and cools the aluminum plug 11.

The first radiator 14-1 is disposed so as to intersect the first straight line 16-1 and such that the first Peltier cooler 12-1 is disposed between the aluminum plug 11 and the first radiator 14-1. The first radiator 14-1 is in thermal contact with the first Peltier cooler 12-1. The first radiator 14-1 has a plurality of fins formed on the side opposite to the side in contact with the first Peltier cooler 12-1.

The first fan 15-1 is disposed so as to intersect the first straight line 16-1 and such that the first radiator 14-1 is disposed between the first fan 15-1 and the first Peltier cooler 12-1. The first fan 15-1 is controlled by the electrical apparatus, to be described later, so as to send outside air toward the plurality of fins formed on the first radiator 14-1.

The cooling device 2 further includes a second Peltier cooler 12-2, a second radiator 14-2, and a second fan 15-2.

The second Peltier cooler 12-2 includes a Peltier element. The second Peltier cooler 12-2 is disposed between the aluminum plug 11 and the second radiator 14-2, and is disposed so as to intersect a second straight line 16-2 connecting the aluminum plug 11 and the second radiator 14-2. The second Peltier cooler 12-2 is further in thermal contact with the aluminum plug 11. The second Peltier cooler 12-2 is controlled by the electrical apparatus, to be described later, so as to transfer heat from the aluminum plug 11 to the second radiator 14-2 by means of the Peltier element. That is, the second Peltier cooler 12-2 heats the second radiator 14-2 and cools the aluminum plug 11.

The second radiator 14-2 is disposed so as to intersect the second straight line 16-2 and such that the second Peltier cooler 12-2 is disposed between the aluminum plug 11 and the second radiator 14-2. The second radiator 14-2 is in thermal contact with the second Peltier cooler 12-2. The second radiator 14-2 has a plurality of fins formed on the side opposite to the side in contact with the second Peltier cooler 12-2.

The second fan 15-2 is disposed so as to intersect the second straight line 16-2 and such that the second radiator 14-2 is disposed between the second fan 15-2 and the second Peltier cooler 12-2. The second fan 15-2 is controlled by the electrical apparatus, to be described later, so as to send outside air toward the plurality of fins formed on the second radiator 14-2.

The cooling device 2 is further formed such that the first straight line 16-1 and the second straight line 16-2 intersect with each other, and that the point at which the first straight line 16-1 and the second straight line 16-2 intersect with each other lies in the aluminum plug 11. That is, the distance from the center of the first radiator 14-1 to the center of the second radiator 14-2 is longer than the distance from the center of the first Peltier cooler 12-1 to the center of the second Peltier cooler 12-2. In this case, the first radiator 14-1 and the second radiator 14-2 can be made relatively large, and the area of their surfaces in contact with air can be made relatively large.

The case 3 forms an outer shell of the radioactive substance visualization camera 10. That is, the sensor module 1 and the cooling device 2 are disposed inside the case 3.

Figure 2:
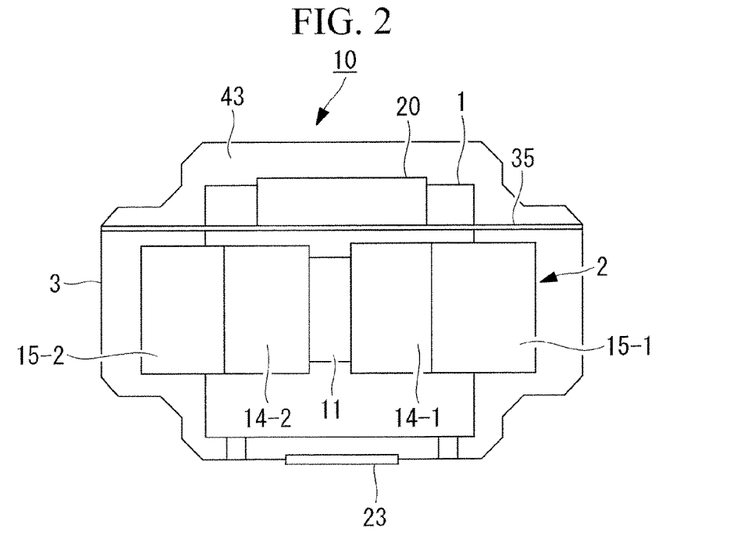
FIG. 2 is a transverse sectional view showing the embodiment of the radioactive substance visualization camera.

As shown in FIG. 2, the radioactive substance visualization camera 10 further includes an electrical apparatus 20. The electrical apparatus 20 is disposed on the vertically upper side than the cooling device 2. The electrical apparatus 20 is electrically connected with the imaging sensor 6, and is connected so as to be able to transmit information. The electrical apparatus 20 supplies power to the imaging sensor 6, and controls the imaging sensor 6 such that radiation data for visualizing a state of distribution of radioactive substances is measured. The electrical apparatus 20 further supplies power to the first Peltier cooler 12-1 and the second Peltier cooler 12-2, and controls the first Peltier cooler 12-1 and the second Peltier cooler 12-2 such that the imaging sensor 6 is cooled. The electrical apparatus 20 further supplies power to the first fan 15-1 and the second fan 15-2, and controls the first fan 15-1 and the second fan 15-2 such that the first radiator 14-1 and the second radiator 14-2 are subjected to air.

Figure 3:
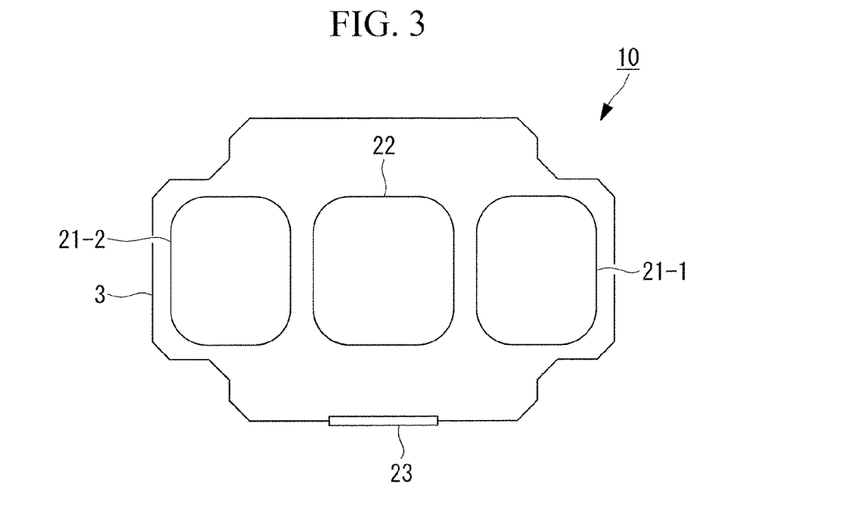
FIG. 3 is a back view showing the embodiment of the radioactive substance visualization camera.
Figure 4:
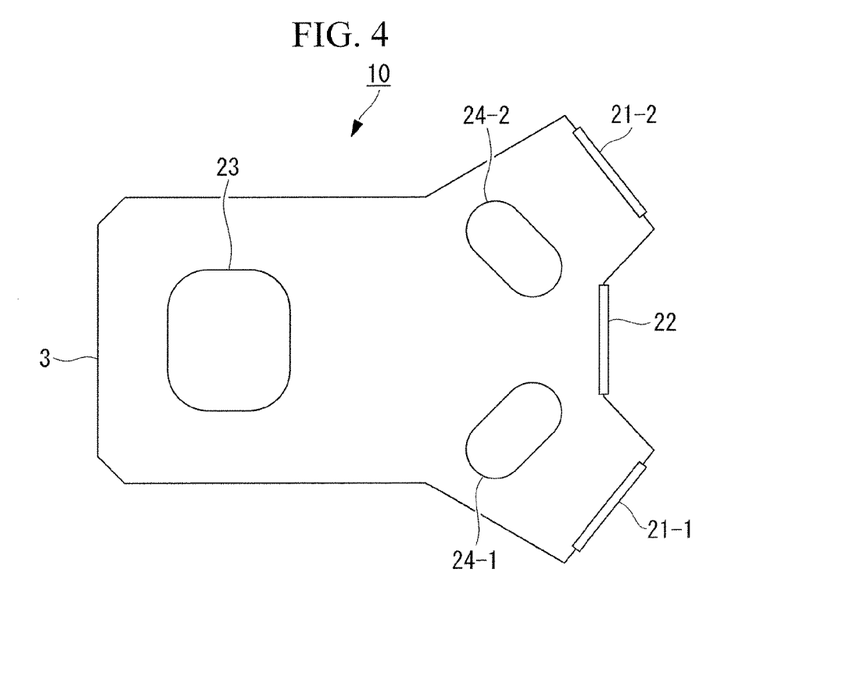
FIG. 4 is a bottom view showing the embodiment of the radioactive substance visualization camera.

As shown in FIG. 3, the case 3 has a first air intake opening 21-1, a second air intake opening 21-2, and a back-side air discharge opening 22 formed in the back surface. As shown in FIG. 4, the case 3 further has a bottom-side air intake opening 23, a first bottom-side air discharge opening 24-1, and a second bottom-side air discharge opening 24-2 formed in the bottom surface.

As shown in FIG. 1, the first air intake opening 21-1 is formed so as to lie on the first straight line 16-1 and such that the first fan 15-1 is disposed between the first air intake opening 21-1 and the first radiator 14-1. The second air intake opening 21-2 is formed so as to lie on the second straight line 16-2 and such that the second fan 15-2 is disposed between the second air intake opening 21-2 and the second radiator 14-2. The first fan 15-1 suctions air from outside the case 3 through the first air intake opening 21-1 and sends the air to the first radiator 14-1. The second fan 15-2 suctions air from outside the case 3 through the second air intake opening 21-2 and sends the air to the second radiator 14-2.

Figure 5:
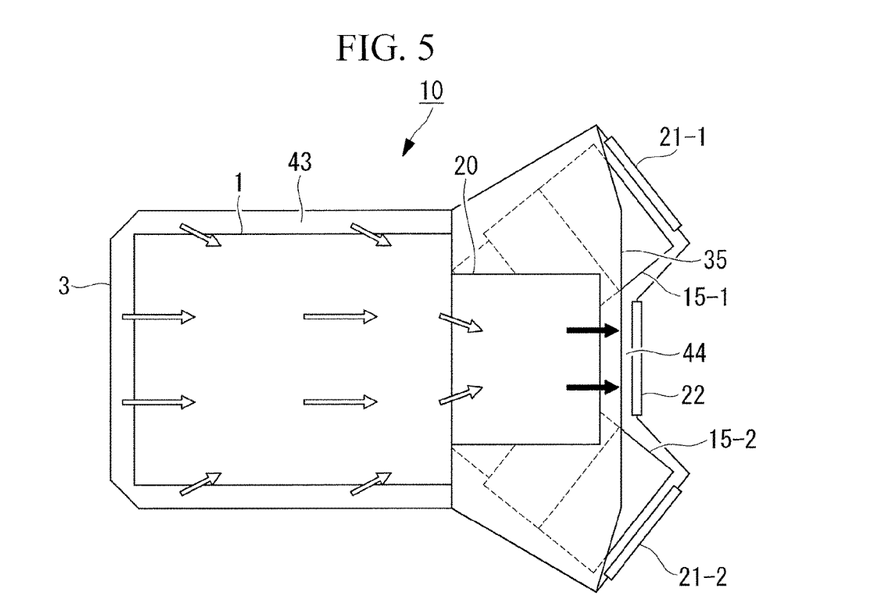
FIG. 5 is a view through an upper surface showing the embodiment of the radioactive substance visualization camera.
Figure 6:
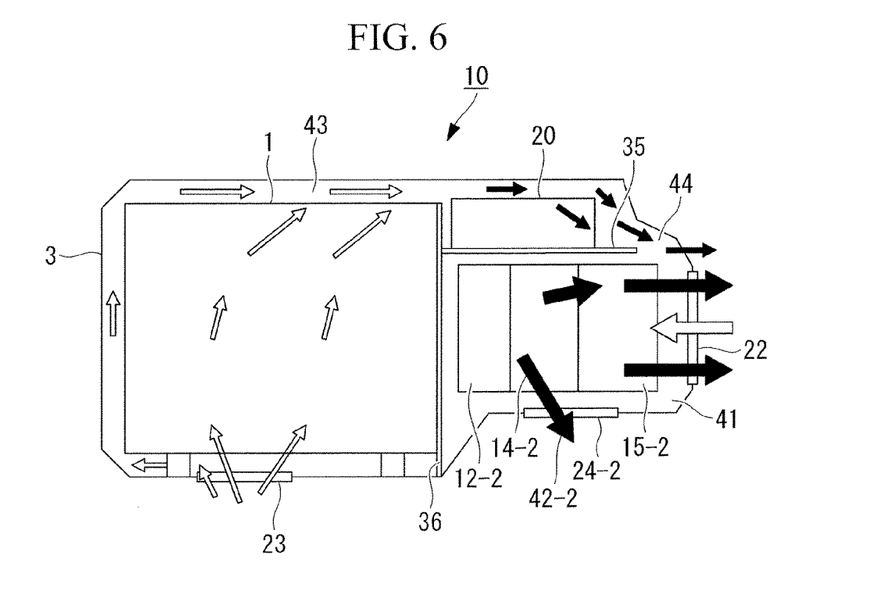
FIG. 6 is a view through a side surface showing the embodiment of the radioactive substance visualization camera.

As shown in FIG. 5, the radioactive substance visualization camera 10 further includes a partition plate 35. The partition plate 35 is formed as a plate. The partition plate 35 is disposed inside the case 3, and is disposed between the electrical apparatus 20 and the cooling device 2. As shown in FIG. 6, the radioactive substance visualization camera 10 further includes a partition plate 36. The partition plate 36 is formed as a plate. The partition plate 36 is disposed inside the case 3.

The partition plate 35 and the partition plate 36, with the case 3, form a rear Peltier cooling passage 41 and a second lower Peltier cooling passage 42-2. The rear Peltier cooling passage 41 discharges air having come into contact with the first radiator 14-1 and air having come into contact with the second radiator 14-2 from the back-side air discharge opening 22. The second lower Peltier cooling passage 42-2 discharges air having come into contact with the second radiator 14-2 from the second bottom-side air discharge opening 24-2.

As shown in FIG. 1, the partition plate 35 and the partition plate 36, with the case 3, form a first lower Peltier cooling passage 42-1. The first lower Peltier cooling passage 42-1 discharges air having come into contact with the first radiator 14-1 from the first bottom-side air discharge opening 24-1.

As shown in FIG. 6, the partition plate 35 and the partition plate 36, with the case 3, further form a casing internal cooling passage 43 and a merging part 44. The merging part 44 is formed on the midstream side of the rear Peltier cooling passage 41, and is formed from the first radiator 14-1 and the second radiator 14-2 to the back-side air discharge opening 22. The casing internal cooling passage 43 is formed between the sensor module 1 and the case 3, and is formed between the electrical apparatus 20 and the case 3. The casing internal cooling passage 43 is connected with the bottom-side air intake opening 23 and is connected with the merging part 44. As air flows through the rear Peltier cooling passage 41, the merging part 44 suctions air from the casing internal cooling passage 43 into the rear Peltier cooling passage 41. That is, while air is flowing through the rear Peltier cooling passage 41, the merging part 44 suctions air from the casing internal cooling passage 43 into the rear Peltier cooling passage 41 by means of the flow of the air flowing through the rear Peltier cooling passage 41.

The aluminum plug 11 of such a radioactive substance visualization camera 10 can be made more compact, so that the camera can be made more compact, than other cameras of which the first straight line 16-1 and the second straight line 16-2 are parallel to each other.

Actions of the radioactive substance visualization camera 10 include a cooling action and an imaging action. The cooling action is performed by the electrical apparatus 20. First, the electrical apparatus 20 controls the first fan 15-1 to thereby send air suctioned through the first air intake opening 21-1 toward the first radiator 14-1, and controls the second fan 15-2 to thereby send air suctioned through the second air intake opening 21-2 toward the second radiator 14-2. The electrical apparatus 20 further controls the first Peltier cooler 12-1 to thereby transfer heat from the aluminum plug 11 to the first radiator 14-1, and controls the second Peltier cooler 12-2 to thereby transfer heat from the aluminum plug 11 to the second radiator 14-2.

In the radioactive substance visualization camera 10, as the cooling action is performed, the aluminum plug 11 is cooled by the first Peltier cooler 12-1 and the second Peltier cooler 12-2. As the aluminum plug 11 is cooled, the imaging sensor 6 is cooled.

When the cooling action is performed, the first radiator 14-1 is heated by the first Peltier cooler 12-1. When the temperature of the first radiator 14-1 is higher than the outside air temperature, the first radiator 14-1 is cooled on contact with air sent by the first fan 15-1. The second radiator 14-2 is cooled by the first fan 15-1 in the same manner as the first radiator 14-1. As the first radiator 14-1 and the second radiator 14-2 are cooled, the first Peltier cooler 12-1 and the second Peltier cooler 12-2 can cool the imaging sensor 6 with high efficiency.

While the air sent by the first fan 15-1 and the second fan 15-2 is flowing through the rear Peltier cooling passage 41, the merging part 44 suctions air from the casing internal cooling passage 43 into the rear Peltier cooling passage 41 by means of the flow of the air flowing through the rear Peltier cooling passage 41. As the air is suctioned by the merging part 44, the casing internal cooling passage 43 suctions air through the bottom-side air intake opening 23, and circulates the air between the sensor module 1 and the case 3 and through the periphery of the electrical apparatus 20.

The imaging action is performed while the cooling action is being performed. The electrical apparatus 20 supplies power to the imaging sensor 6 and controls the imaging sensor 6 to thereby measure radiation data. The radiation data shows a plurality of directions and a plurality of pieces of radioactivity data corresponding to the plurality of directions. Of the plurality of pieces of radioactivity data, a piece of radioactivity data corresponding to a certain direction shows the nuclide of the radioactive substance disposed in that direction from the radioactive substance visualization camera 10, and shows the amount of substance of the nuclide. The electrical apparatus 20 outputs the radiation data to an external apparatus.

The radiation data is analyzed and thereby processed into a radioactive substance visualization image. The radioactive substance visualization image is formed of a plurality of regions corresponding to the plurality of directions. In a region corresponding to a certain direction of the plurality of regions, an image of an object disposed in that direction is projected, and a piece of radioactivity data of the plurality of pieces of radioactivity data corresponding to that direction is shown over the image of the object. Such a radioactive substance visualization image can display a state of distribution of radioactive substances in a manner that makes it more easily understandable.

According to such a radioactive substance visualization camera 10, the electrical apparatus 20 is cooled and prevented from overheating as air flows through the casing internal cooling passage 43. Since overheating of the electrical apparatus 20 is prevented, the radioactive substance visualization camera 10 can adequately control the imaging sensor 6, the first Peltier cooler 12-1, the second Peltier cooler 12-2, the first fan 15-1, and the second fan 15-2. As the first Peltier cooler 12-1, the second Peltier cooler 12-2, the first fan 15-1, and the second fan 15-2 are adequately controlled, the radioactive substance visualization camera 10 can adequately cool the imaging sensor 6. As the imaging sensor 6 is adequately controlled, the radioactive substance visualization camera 10 can adequately measure radiation data.

While the radioactive substance visualization camera 10 is being used outdoors, the case 3 may reach a high temperature due to exposure to sunlight. According to such a radioactive substance visualization camera 10, as air flows through the casing internal cooling passage 43, the amount of heat conducted from the case 3 is reduced, so that the sensor module 1 is prevented from being heated by sunlight. As the amount of heat conducted from the case 3 is reduced, the sensor module 1 can adequately cool the imaging sensor 6 and adequately measure radiation data.

Since the radioactive substance visualization camera 10 uses the flow of air flowing through the rear Peltier cooling passage 41 to circulate air through the casing internal cooling passage 43, it can circulate air through the casing internal cooling passage 43 without using a fan for sending air to the casing internal cooling passage 43. Therefore, the radioactive substance visualization camera 10 can be made more lightweight and more compact than other radioactive substance visualization cameras which include a fan for sending air to the casing internal cooling passage 43.

In the radioactive substance visualization camera 10, as the aluminum plug 11 is cooled, dew condensation occurs in the periphery of the aluminum plug 11 and water droplets formed by the dew condensation may fall. In the radioactive substance visualization camera 10, since the electrical apparatus 20 is disposed further on the vertically upper side than the aluminum plug 11, water droplets formed by dew condensation are unlikely to come into contact with the electrical apparatus 20. Thus, the radioactive substance visualization camera 10 can reduce the negative effects of the water droplets on the electrical apparatus 20.

While the radioactive substance visualization camera 10 is being used outdoors, raindrops may enter through the holes formed in the case 3. The radioactive substance visualization camera 10 has the first air intake opening 21-1, the second air intake opening 21-2, the back-side air discharge opening 22, the bottom-side air intake opening 23, the first bottom-side air discharge opening 24-1, and the second bottom-side air discharge opening 24-2 formed in a region of the case 3 further on the vertically lower side than the electrical apparatus 20. Therefore, the radioactive substance visualization camera 10 can reduce the negative effects of raindrops entering through the holes formed in the case 3 on the electrical apparatus 20.

The aluminum plug 11 can be substituted with a heat conducting member which is formed of a material other than metal aluminum. The material has a heat conductivity higher than the heat conductivity of the material forming the sensor case 5. The radioactive substance visualization camera including such a heat conducting member can also be made compact as with the radioactive substance visualization camera of the already-described embodiment.

Figure 7:
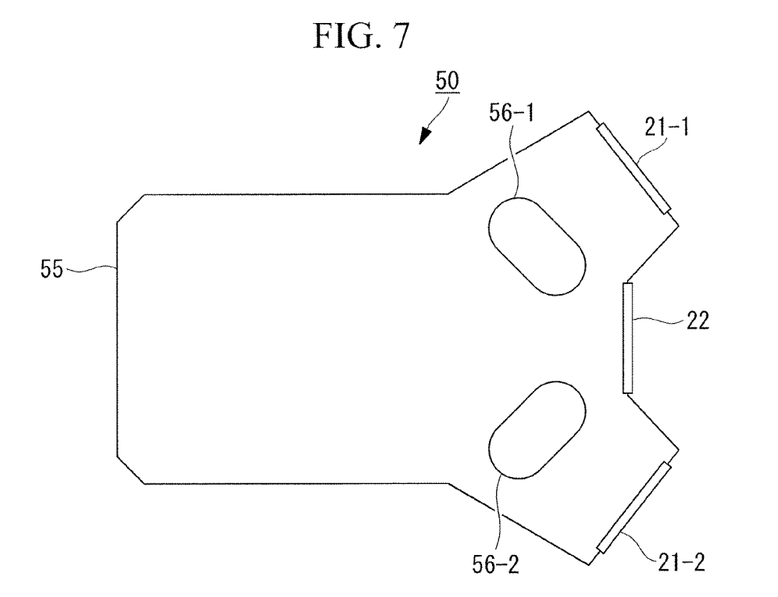
FIG. 7 is a top view showing another embodiment of the radioactive substance visualization camera.

FIG. 7 shows another embodiment of the radioactive substance visualization camera. In a radioactive substance visualization camera 50, the case 3 of the radioactive substance visualization camera 10 of the already-described embodiment is substituted with another case 55. As with the case 3, the case 55 has the first air intake opening 21-1, the second air intake opening 21-2, the back-side air discharge opening 22, the bottom-side air intake opening 23, the first bottom-side air discharge opening 24-1, and the second bottom-side air discharge opening 24-2. The case 55 further has a first top-side air discharge opening 56-1 and a second top-side air discharge opening 56-2.

Figure 8:
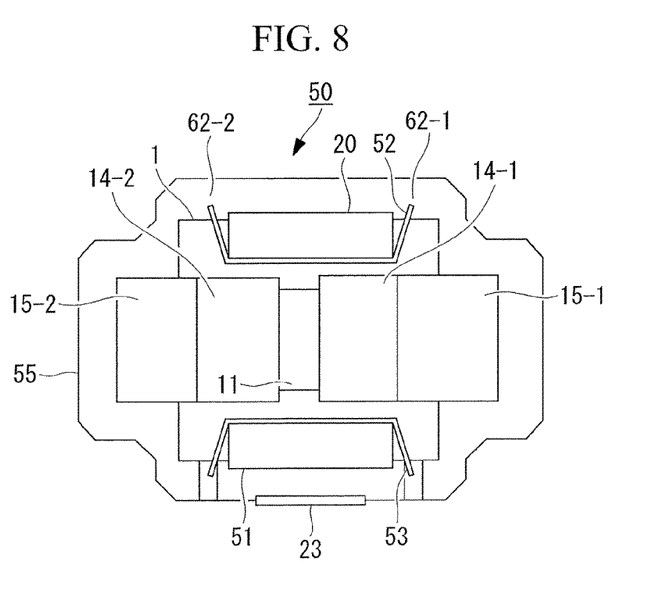
FIG. 8 is a transverse sectional view showing the another embodiment of the radioactive substance visualization camera.

As shown in FIG. 8, the radioactive substance visualization camera 50 further includes an electrical apparatus 51. The electrical apparatus 51 is disposed on the vertically lower side of the cooling device 2. The electrical apparatus 51 is provided with waterproofing measures so as to work properly even on contact with water droplets. The electrical apparatus 51 controls, with the electrical apparatus 20, the imaging sensor 6, the first Peltier cooler 12-1, the second Peltier cooler 12-2, the first fan 15-1, and the second fan 15-2. As with the electrical apparatus 51, the electrical apparatus 20 is provided with waterproofing measures so as to work properly even on contact with water droplets.

In the radioactive substance visualization camera 50, the partition plate 35 and the partition plate 36 of the radioactive substance visualization camera 10 of the already-described embodiment are also substituted with other partition plates 52, 53. The partition plate 52 is formed as a bent plate. The partition plate 52 is disposed inside the case 3 and is disposed between the electrical apparatus 20 and the cooling device 2. The partition plate 53 is formed as a bent plate. The partition plate 53 is disposed inside the case 3 and is disposed between the electrical apparatus 51 and the cooling device 2.

Figure 9:
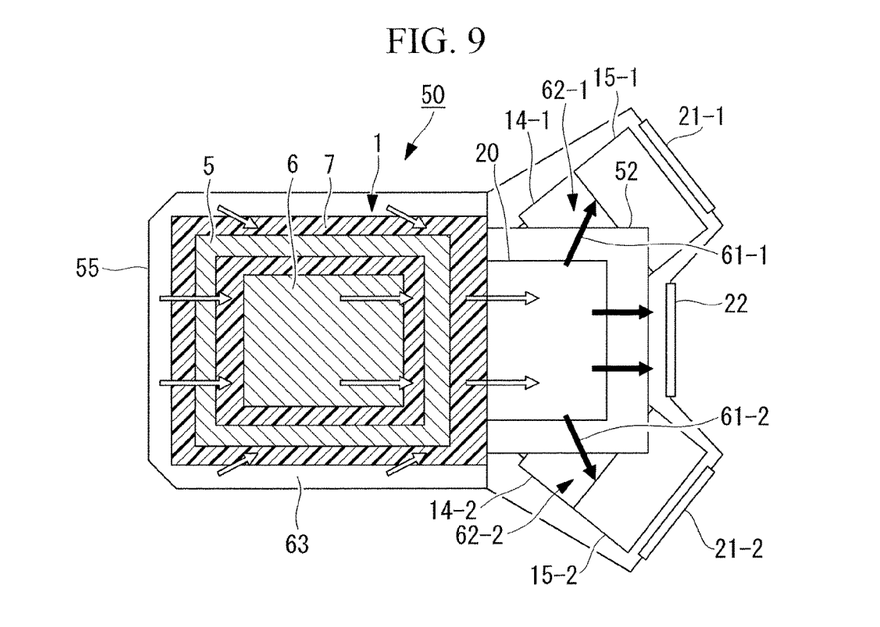
FIG. 9 is a sectional view showing the another embodiment of the radioactive substance visualization camera.

As shown in FIG. 9, the partition plate 52, with the case 55, forms a first upper Peltier cooling passage 61-1, a second upper Peltier cooling passage 61-2, a first upper merging part 62-1, a second upper merging part 62-2, and an upper casing internal cooling passage 63. The first upper Peltier cooling passage 61-1 discharges air having come into contact with the first radiator 14-1 from the first top-side air discharge opening 56-1. The second upper Peltier cooling passage 61-2 discharges air having come into contact with the second radiator 14-2 from the second top-side air discharge opening 56-2.

The first upper merging part 62-1 is formed on the midstream side of the first upper Peltier cooling passage 61-1 and is formed from the first radiator 14-1 to the first top-side air discharge opening 56-1. The second upper merging part 62-2 is formed on the midstream side of the second upper Peltier cooling passage 61-2 and is formed from the second radiator 14-2 to the second top-side air discharge opening 56-2.

The upper casing internal cooling passage 63 is formed between the sensor module 1 and the case 55 and is formed between the electrical apparatus 20 and the case 55. The upper casing internal cooling passage 63 is connected with the bottom-side air intake opening 23 and is connected with the first upper merging part 62-1 and the second upper merging part 62-2.

As air flows through the first upper Peltier cooling passage 61-1, the first upper merging part 62-1 suctions air from the upper casing internal cooling passage 63 into the first upper Peltier cooling passage 61-1. That is, when air is flowing through the first upper Peltier cooling passage 61-1, the first upper merging part 62-1 suctions air from the upper casing internal cooling passage 63 into the first upper Peltier cooling passage 61-1 by means of the flow of the air flowing through the first upper Peltier cooling passage 61-1. As air flows through the second upper Peltier cooling passage 61-2, the second upper merging part 62-2 suctions air from the upper casing internal cooling passage 63 into the second upper Peltier cooling passage 61-2. That is, when air is flowing through the second upper Peltier cooling passage 61-2, the second upper merging part 62-2 suctions air from the upper casing internal cooling passage 63 into the second upper Peltier cooling passage 61-2 by means of the flow of the air flowing through the second upper Peltier cooling passage 61-2.

Figure 10:
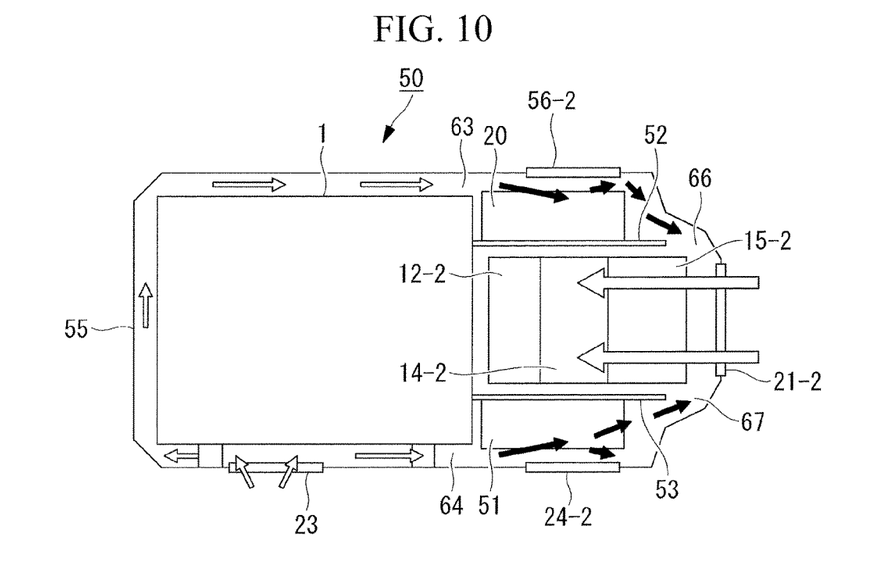
FIG. 10 is a vertical sectional view showing the another embodiment of the radioactive substance visualization camera.

As shown in FIG. 10, the partition plate 53, with the case 55, forms a lower casing internal cooling passage 64, and as with the partition plate 52, forms the first lower Peltier cooling passage, the second lower Peltier cooling passage, a first lower merging part, and a second lower merging part (all not shown). The first lower Peltier cooling passage discharges air having come into contact with the first radiator 14-1 from the first bottom-side air discharge opening 24-1. The second lower Peltier cooling passage discharges air having come into contact with the second radiator 14-2 from the second bottom-side air discharge opening 24-2.

The first lower merging part is formed on the midstream side of the first lower Peltier cooling passage and is formed from the first radiator 14-1 to the first bottom-side air discharge opening 24-1. The second lower merging part is formed on the midstream side of the second lower Peltier cooling passage and is formed from the second radiator 14-2 to the second bottom-side air discharge opening 24-2.

The lower casing internal cooling passage 64 is formed between the sensor module 1 and the case 55 and is formed between the electrical apparatus 51 and the case 55. The lower casing internal cooling passage 64 is connected with the bottom-side air intake opening 23 and is connected with the first lower merging part and the second lower merging part.

As air flows through the first lower Peltier cooling passage, the first lower merging part suctions air from the lower casing internal cooling passage 64 into the first lower Peltier cooling passage. That is, when air is flowing through the first lower Peltier cooling passage, the first lower merging part suctions air from the lower casing internal cooling passage 64 into the first lower Peltier cooling passage by means of the flow of the air flowing through the first lower Peltier cooling passage. As air flows through the second lower Peltier cooling passage, the second lower merging part suctions air from the lower casing internal cooling passage 64 into the second lower Peltier cooling passage. That is, when air is flowing through the second lower Peltier cooling passage, the second lower merging part suctions air from the lower casing internal cooling passage 64 into the second lower Peltier cooling passage by means of the flow of the air flowing through the second lower Peltier cooling passage.

Figure 11:
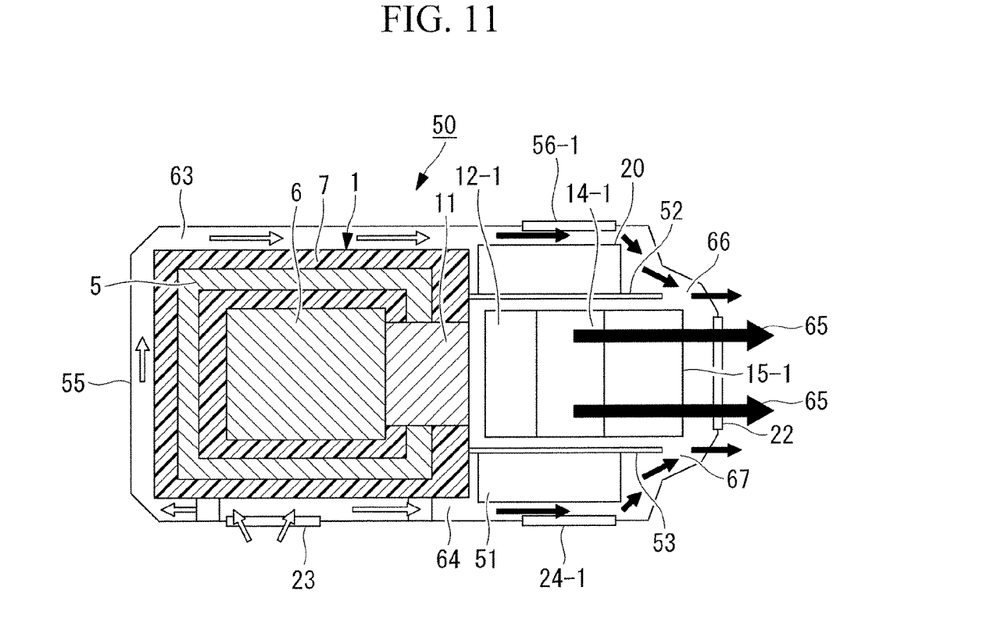
FIG. 11 is a vertical sectional view showing the another embodiment of the radioactive substance visualization camera.

As shown in FIG. 11, the partition plate 52 and the partition plate 53, with the case 55, form a rear Peltier cooling passage 65. As with the rear Peltier cooling passage 41 of the already-described embodiment, the rear Peltier cooling passage 65 discharges air having come into contact with the first radiator 14-1 and air having come into contact with the second radiator 14-2 from the back-side air discharge opening 22.

The partition plate 52, with the case 55, further forms an upper merging part 66. The upper merging part 66 is formed on the midstream side of the rear Peltier cooling passage 65 and is formed from the first radiator 14-1 and the second radiator 14-2 to the back-side air discharge opening 22. The upper merging part 66 is connected with the upper casing internal cooling passage 63. As air flows through the rear Peltier cooling passage 65, the upper merging part 66 suctions air from the upper casing internal cooling passage 63 into the rear Peltier cooling passage 65. That is, when air is flowing through the rear Peltier cooling passage 65, the upper merging part 66 suctions air from the upper casing internal cooling passage 63 into the rear Peltier cooling passage 65 by means of the flow of the air flowing through the rear Peltier cooling passage 65.

The partition plate 52, with the case 55, further forms a lower merging part 67. The lower merging part 67 is formed on the midstream side of the rear Peltier cooling passage 65 and is formed from the first radiator 14-1 and the second radiator 14-2 to the back-side air discharge opening 22. The lower merging part 67 is connected with the upper casing internal cooling passage 63. As air flows through the rear Peltier cooling passage 65, the lower merging part 67 suctions air from the upper casing internal cooling passage 63 into the rear Peltier cooling passage 65. That is, when air is flowing through the rear Peltier cooling passage 65, the lower merging part 67 suctions air from the upper casing internal cooling passage 63 into the rear Peltier cooling passage 65 by means of the flow of the air flowing through the rear Peltier cooling passage 65.

The radioactive substance visualization camera 50 works almost in the same manner as the radioactive substance visualization camera 10 of the already-described embodiment. That is, the electrical apparatus 20 and the electrical apparatus 51 control the first fan 15-1 to thereby send air, suctioned through the first air intake opening 21-1, toward the first radiator 14-1, and control the second fan 15-2 to thereby send air, suctioned through the second air intake opening 21-2, toward the second radiator 14-2. As air is sent by the first fan 15-1 to the first radiator 14-1, the first radiator 14-1 is cooled. As air is sent by the second fan 15-2 to the second radiator 14-2, the second radiator 14-2 is cooled.

The electrical apparatus 20 and the electrical apparatus 51 further control the first Peltier cooler 12-1 to thereby transfer heat from the aluminum plug 11 to the first radiator 14-1, and control the second Peltier cooler 12-2 to thereby transfer heat from the aluminum plug 11 to the second radiator 14-2. The aluminum plug 11 is cooled through these actions. As the aluminum plug 11 is cooled, the imaging sensor 6 is cooled.

As the first fan 15-1 and the second fan 15-2 send air, the first upper merging part 62-1, the second upper merging part 62-2, and the upper merging part 66 suction air from the upper casing internal cooling passage 63 into the first upper Peltier cooling passage 61-1, the second upper Peltier cooling passage 61-2, and the rear Peltier cooling passage 65. As air is suctioned by the first upper merging part 62-1, the second upper merging part 62-2, and the upper merging part 66, air flows through the upper casing internal cooling passage 63. As air flows through the upper casing internal cooling passage 63, the radioactive substance visualization camera 50 cools the electrical apparatus 20 and reduces the amount of heat conducted from the case 55 to the sensor module 1.

As the first fan 15-1 and the second fan 15-2 send air, the first lower merging part, the second lower merging part, and the lower merging part 67 suction air from the lower casing internal cooling passage 64 into the first lower Peltier cooling passage 42-1, the second lower Peltier cooling passage 42-2, and the rear Peltier cooling passage 65. As air is suctioned by the first lower merging part, the second lower merging part, and the lower merging part 67, air flows through the lower casing internal cooling passage 64. As air flows through the lower casing internal cooling passage 64, the radioactive substance visualization camera 50 cools the electrical apparatus 51 and reduces the amount of heat conducted from the case 55 to the sensor module 1.

While the imaging sensor 6 is being cooled, the electrical apparatus 20 and the electrical apparatus 51 control the imaging sensor 6 in the same manner as the electrical apparatus 20 of the radioactive substance visualization camera 10 of the already-described embodiment, to thereby measure radiation data.

In such a radioactive substance visualization camera 50, as with the radioactive substance visualization camera 10 of the already-described embodiment, overheating of the electrical apparatus 20 and the electrical apparatus 51 is prevented, and the amount of heat conducted from the case 3 to the sensor module 1 is reduced, so that radiation data can be measured adequately.

Moreover, the radioactive substance visualization camera 50 can circulate air through the upper casing internal cooling passage 63 and the lower casing internal cooling passage 64 by means of the flow of air generated by the first fan 15-1 and the second fan 15-2. Therefore, the radioactive substance visualization camera 50 can be made more lightweight and more compact than other radioactive substance visualization cameras which include a fan for sending air to the upper casing internal cooling passage 63 and the lower casing internal cooling passage 64.

In the radioactive substance visualization camera 50, as the aluminum plug 11 is cooled, dew condensation occurs in the periphery of the aluminum plug 11 and water droplets formed by the dew condensation may fall. Since the electrical apparatus 51 is provided with the waterproofing measures, it works properly even on contact with water droplets formed by dew condensation. While the radioactive substance visualization camera 50 is being used outdoors, raindrops may enter through the holes formed in the case 3. Since the electrical apparatus 20 is provided with the waterproofing measures, it works properly even on contact with entering raindrops.

In the radioactive substance visualization camera 10 of the already-described embodiment, since the electrical apparatus 20 is disposed on the vertically upper side of the aluminum plug 11, water droplets formed by dew condensation in the periphery of the aluminum plug 11 are unlikely to come, into contact with the electrical apparatus 20, so that the level of waterproofing measures for the electrical apparatus 20 can be lowered. Since the level of waterproofing measures for the electrical apparatus 20 is lowered, the electrical apparatus 20 of the radioactive substance visualization camera 10 of the already-described embodiment can be produced more easily than the electrical apparatus 51.

Moreover, since the radioactive substance visualization camera 10 of the already-described embodiment has no hole formed in the top surface of the case 3, water droplets are unlikely to enter the case 3, so that the level of waterproofing measures for the electrical apparatus 20 can be lowered. Since the level of waterproofing measures for the electrical apparatus 20 is lowered, the radioactive substance visualization camera 10 of the already-described embodiment can be produced more easily than the radioactive substance visualization camera 50.

REFERENCE SIGNS LIST 1 sensor module
2 cooling device
3 case
10 radioactive substance visualization camera
11 aluminum plug
12-1 first Peltier cooler
12-2 second Peltier cooler
14-1 first radiator
14-2 second radiator
15-1 first fan
15-2 second fan
20 electrical apparatus
21-1 first air intake opening
21-2 second air intake opening
22 back-side air discharge opening
23 bottom-side air intake opening
24-1 first bottom-side air discharge opening
24-2 second bottom-side air discharge opening
35 partition plate
36 partition plate
41 rear Peltier cooling passage
42-1 first lower Peltier cooling passage
42-2 second lower Peltier cooling passage
43 casing internal cooling passage
44 merging part
50 radioactive substance visualization camera
51 electrical apparatus
52 partition plate
53 partition plate
55 case
56-1 first top-side air discharge opening
56-2 second top-side air discharge opening
61-1 first upper Peltier cooling passage
61-2 second upper Peltier cooling passage
62-1 first upper merging part
62-2 second upper merging part
63 upper casing internal cooling passage
64 lower casing internal cooling passage
65 rear Peltier cooling passage
66 upper merging part
67 lower merging part

The invention claimed is:

1. A camera comprising:
a sensor module which includes an imaging sensor and which, on exposure to radiation, measures radiation data for visualizing a state of distribution of radioactive substances;
an electrical apparatus that is a heat generation part and is different from the sensor module, the electrical apparatus being configured to control the imaging module such that radiation data is measured;
a cooling device; and
a case inside of which the sensor module, the cooling device, and the electrical apparatus are disposed,
wherein the cooling device includes:
a heat conducting member;
a heat radiation part having a plurality of fins and radiating heat generated when the sensor module is cooled; and
a fan that generates a flow of a first fluid for cooling the heat radiation part,
wherein the case has an air intake opening formed in a back surface thereof, and forms a first passage through which the first fluid flows, a second passage through which a second fluid for cooling the electrical apparatus flows, a partition plate which separates the first passage and the second passage, and a merging part which sucks the second fluid from the second passage into the first passage by means of the flow of the first fluid,
wherein the fan is disposed between the air intake opening and the heat radiation part,
wherein the heat radiation part is disposed between the fan and the heat conducting member, and
wherein the fan suctions air from outside the case through the air intake opening and sends the air towards the fins of the heat conducting member.

2. The camera according to claim 1, wherein the heat conducting member comes into thermal contact with the sensor module, and the electrical apparatus is disposed further on a vertically upper side than the heat conducting member.

3. The camera according to claim 1, wherein
the case has an air intake opening for supplying the second fluid from outside the case to the second passage, and
the air intake opening is disposed in a region of the case further on a vertically lower side than the electrical apparatus.

4. The camera according to claim 1, wherein the second passage, through which the second fluid flows, is formed between the sensor module and the case.

5. The camera according to claim 2, wherein
the case further has an air intake opening for supplying the second fluid from outside the case to the second passage, and
the air intake opening is disposed in a region of the case further on a vertically lower side than the electrical apparatus.

6. The camera according to claim 2, wherein the second passage through which the second fluid flows is formed between the sensor module and the case.

7. The camera according to claim 3, wherein the second passage through which the second fluid flows is formed between the sensor module and the case.

8. The camera according to claim 5, wherein the second passage through which the second fluid flows is formed between the sensor module and the case.

9. The camera according to claim 1,
wherein the fan comprises a first fan and a second fan,
wherein the heat radiation part comprises a first heat radiation part and a second heat radiation part,
wherein the first fan is disposed so as to intersect a first straight line connecting the heat conducting member and the first heat radiation part,
wherein the second fan is disposed so as to intersect a second straight line connecting the heat conducting member and the second heat radiation part, and
wherein the cooling device is formed such that the first straight line and the second straight line intersect with each other at a point which lies in the heat conducting member.

* * * * *